Nov. 14, 1961  C. J. CITTADINO  3,008,401
AIR CONDITIONING AND HEATING SYSTEM FOR DRIVE-IN THEATER
Filed Feb. 9, 1959  2 Sheets-Sheet 1
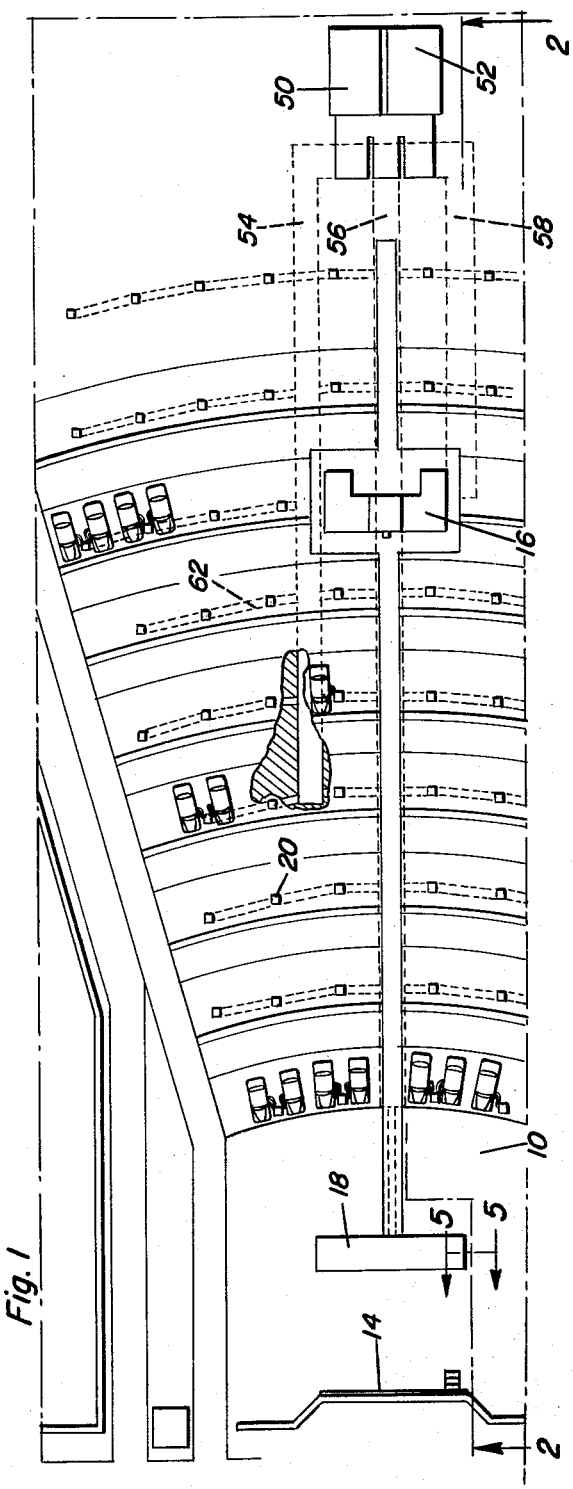
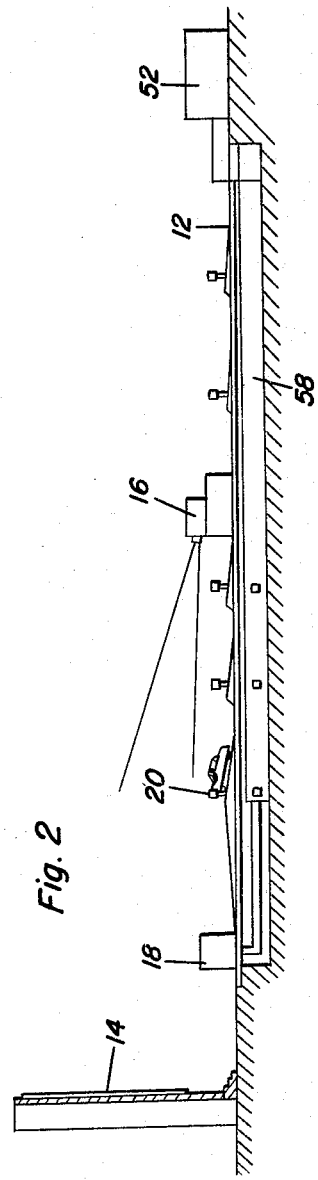
Charles J. Cittadino
INVENTOR.

Nov. 14, 1961 C. J. CITTADINO 3,008,401
AIR CONDITIONING AND HEATING SYSTEM FOR DRIVE-IN THEATER
Filed Feb. 9, 1959 2 Sheets-Sheet 2
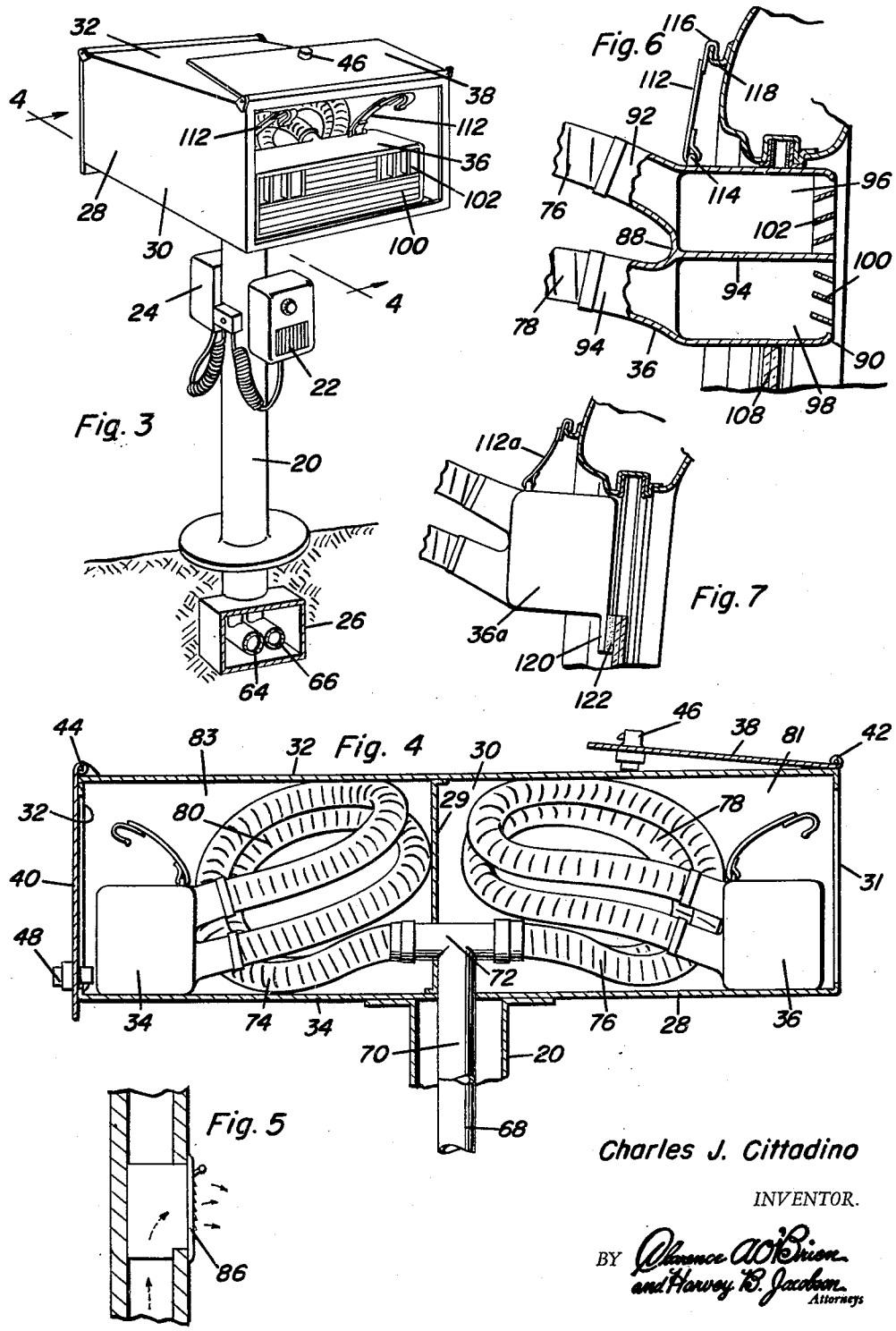
Charles J. Cittadino
INVENTOR.

United States Patent Office 3,008,401
Patented Nov. 14, 1961

3,008,401
AIR CONDITIONING AND HEATING SYSTEM FOR DRIVE-IN THEATER
Charles J. Cittadino, River Road Drive, Independence, La.
Filed Feb. 9, 1959, Ser. No. 792,042
5 Claims. (Cl. 98—2)

This invention relates to drive-in theaters and more particularly to an air-conditioning system for the patrons' automobiles while parked.

An object of the invention is to provide an air-conditioning system for an open air theater, the air-conditioning system providing heated air or cooled air, depending on the season of the year, to the patrons' motor vehicles and to the control room, seat containing room, if any, and any other enclosure, constituting part of the drive-in theater.

A further object of the invention is to provide an underground system which uses the upright posts of the theater ordinarily holding only the speaker and its controls, to receive a single or a pair of air conductors for each motor vehicle serviced by the post. One air conductor is a pressure conductor, and the other is a suction conductor so that the interior of the motorist's vehicle is well heated or cooled and ventilated due to a complete circulation of air within the interior of the motor vehicle. When a single conductor for each post is used, it will be used as a pressure conductor of either heated or chilled air.

Another object of the invention is to provide a system for air-conditioning the patrons' automobiles in a drive-in theater, which is practical utilizing high velocity or low pressure heating or cooling. The system has very little visible equipment, and is as easy to apply to the automobile as the speaker and speaker control by the motorists or other occupant of the motor vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary top plan view of a typical open air theater, parts being broken away in section to illustrate otherwise hidden detail.

FIGURE 2 is a diagrammatic sectional view taken on the line 2—2 of FIGURE 1.

FIGURE 3 is a perspective view of a post in the drive-in theater equipped with a part of the air-conditioning system.

FIGURE 4 is a sectional view on an enlarged scale and taken on the line 4—4 of FIGURE 3.

FIGURE 5 is an enlarged sectional view taken on the line 5—5 of FIGURE 1.

FIGURE 6 is a fragmentary sectional view of a part of a motor vehicle showing partially in section and partially in elevation a nozzle that constitutes part of the air-conditioning system.

FIGURE 7 is a view similar to FIGURE 6 but showing an alternate nozzle mounting construction.

In the accompanying drawings there is a drive-in theater 10, diagrammatically represented in FIGURES 1 and 2. Although the drive-in theaters are arranged with different plans, it is customary to have motor vehicle driving lanes and parking spaces 12 arranged in arcs behind viewing screen 14. The projector is in the projection room 16 at a point spaced from the screen 14, and some installations have front room 18 furnished with seats within which to view screen 14. Practically every open-air theater has a number of upright posts, for instance typical post 20, (FIGURE 3) on which speaker units 22 and 24 are separably mounted to service adjacent motor vehicles on opposite sides of the post 20. In accordance with the invention post 20 is made hollow and has a ground box 26 at its lower end to which the post is secured. The upper end of hollow post 20 has a housing 28 provided with a pair of side walls 30, a top wall 32 and a bottom wall 34 which is secured to the upper end of post 20. Both ends of housing 28 have entrances 31 and 32 respectively within which to store a pair of nozzles 34 and 36. Doors 38 and 40 are secured by hinges 42 and 44 to one of the walls, for instance the top wall 32 of housing 28, and there are key controlled locks 46 and 48 connected with each of the doors and engageable with a lower part of the housing to retain the doors 38 and 40 in the locked condition when the open air theater is not in use.

A central heating plant 50 and a central air-conditioning plant 52 are located in a place remote from the parking area. The central heating plant and air-conditioning plant are preferably made as a summer-winter hook-up, using the same duct system for heat and for cooled air. The heating plant and air-conditioning plant of themselves are conventional, however, it is considered that the application of these plants is new.

There are underground ducts 54, 56 and 58 used as main feeders and return ducts to service the illustrated posts (FIGURE 1). Ducts 54, 56 and 58 are preferably constructed with two passages in each, one for pressure and the other for suction in order to conduct heated or cooled air under pressure to the nozzles at post 20 and also to return the air for recirculation, in whole or in part depending on engineering design for the heating and the ventilating or cooling.

A plurality of lateral feeders 62 extend from the ducts 54, 56 and 58, and each post 20 is serviced from one of these feeders. The type of duct work used is left within the prerogative of the manufacturer. However, for economy of construction something similar to 3-inch stove pipe or tubular duct work is connected with the feeders 62. Such ducts are seen in FIGURE 3 wherein the air conductors 64 and 66 are mounted in the ground box 26 and have vertical riser conductors 68 and 70 connected therewith and extending upwardly therefrom through the hollow post 20. Conductor 70 has a T-fitting 72 at its upper end (FIGURE 4), and hoses 74 and 76, consisting of light, flexible hose material, are connected to the ends of the T-fitting 72. Hoses 78 and 80 are also in housing 28 at the upper extremity of conductor 68. A vertical partition 29 is in casing or housing 28, separating it into a pair of compartments 81 and 83, nozzle 36 being located in compartment 81, and nozzle 34 being located in compartment 83. The hoses 74 and 80 are located in compartment 83. The hoses 76 and 78 are suction and pressure hoses respectively as are the corresponding air conductors 70 and 68 respectively. Hoses 80 and 74 are also suction and pressure hoses respectively to supply nozzle 34.

One of the feeders has an air register 86 (FIGURE 5) in order ot supply heated or cooled air to room 18. The air register 86 is preferably a conventional register, and it is understood that more than one such register may be provided for room 18 depending on its size, heat loading, etc. Further, a return register connected with a return duct may be furnished for room 18. Here again, engineering design is relied on to determine the necessity of such a return register.

Nozzle 36 is constructed of a casing (FIGURE 6) having four side walls, a rear wall 88 and a front 90. The rear wall has two sleeves 92 and 94 connected therewith for the hoses 78 and 76. A horizontal divider 94 is in the casing of nozzle 36, separating the nozzle into a discharge section 96 and a suction section 98. Horizontal louvers 100 are in the front 90 of nozzle 36, and a combination of horizontal and vertical louvers 102 is in the front 90 in registry with section 96. The louvers may be fixed or the type capable of pivotal adjustments.

Nozzle 36 is adapted to seat on the upper edge of the motor vehicle window 108 and abut the upper edge of the window frame (FIGURE 6), and there is a stabilizing strap 112 attached to a bracket 114 on the top wall of the nozzle. A hook 116 at the upper end of the strap 112 is engageable in the rain gutter 118 of the motor vehicle thereby holding the nozzle in place.

Nozzle 36a (FIGURE 7) is a modification. The distinctions between nozzles 36 and 36a are in the horizontal depth of their casings and the way in which they are mounted. FIGURE 7 shows that there is a depending flange 120 at the lower front edge of nozzle 36a, and it has a pad 122 thereon to abut the outside surface of the motor vehicle window. Strap 112a is identical to strap 112, but it serves a supporting function rather than merely a stabilizing function in that nozzle 36a is hung by strap 112a.

The use and operation of the invention is now deemed apparent. To be summarized, the patron may attach the nozzle to his motor vehicle as described herein. His vehicle is then furnished with hot or cold air, depending on the seasonal requirements. At the same time, some of the air in the motor vehicle is returned for re-circulation. The main, central plants 50 and 52 supply either the entire open air theater or a section thereof depending on the capacity of the heating and air-conditioning plant.

Auto post 20 may be used for other services besides heating or cooling. Electrical conductors may be passed therethrough, and the housing 28 accommodates such articles as telephones, radios, etc.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A motor vehicle air conditioning system for a drive-in theater comprising, in combination, a central air conditioning plant, warm and cold air delivery and return conduits connected to said plant, a plurality of tubular posts, horizontally elongated housings mounted on the upper ends of said posts, transverse partitions defining compartments in the housings, pairs of air conducting pipes extending vertically through the posts into the housings and connected at their lower ends to the conduits, T-heads on the upper ends of said pipes extending horizontally through the partitions, hose having one of their ends connected to the T-heads on opposite sides of the partitions, nozzles comprising discharge and intake compartments connected to the other ends of said hose, and means for securing said nozzles in position on vehicles on opposite sides of the posts in communication therewith through partially open windows thereof, said hose and said nozzles, when not in use, being storable in the compartments, said housings being open at their ends for providing access to the compartments for removing and replacing said hose and said nozzles, and lock-equipped doors hingedly mounted on the housings for closing said open ends thereof.

2. A motor vehicle air conditioning system for a drive-in theater comprising, in combination, a central air conditioning plant, warm and cold air delivery and return conduits connected to said plant, a plurality of tubular posts, horizontally elongated housings mounted on the upper ends of said posts, transverse partitions defining compartments in the housings, pairs of air conducting pipes extending vertically through the posts into the housings and connected at their lower ends to the conduits, T-heads on the upper ends of said pipes extending horizontally through the partitions, hose having one of their ends connected to the T-heads on opposite sides of the partitions, nozzles comprising discharge and intake compartments connected to the other ends of said hose, and means for securing said nozzles in position on vehicles on opposite sides of the posts in communication therewith through partially open windows thereof, said means including hooks on the upper portions of the nozzles engageable in rain gutters of the vehicles for suspending said nozzles therefrom in registry with the windows, said means further including depending flanges on the nozzles adapted for face-abutting engagement with the upper portions of the window panes.

3. A motor vehicle air conditioning system for a drive-in theater comprising, in combination, a central air conditioning plant, warm and cold air delivery and return conduits connected to said plant, a plurality of tubular posts, horizontally elongated housings mounted on the upper ends of said posts, transverse partitions defining compartments in the housings, pairs of air conducting pipes extending vertically through the posts into the housings and connected at their lower ends to the conduits, T-heads on the upper ends of said pipes extending horizontally through the partitions, hose having one of their ends connected to the T-heads on opposte sides of the partitions, nozzles comprising discharge and intake compartments connected to the other ends of said hose, and means for securing said nozzles in position on vehicles on opposite sides of the posts in communication therewith through partially open windows thereof, said hoses and said nozzles, when not in use, being storable in the compartments, said housings being open at their ends for providing access to the compartments for removing and replacing said hose and said nozzles, and lock-equipped doors hingedly mounted on the housings for closing said open ends thereof, said means including hooks on the upper portion of the nozzles engageable in rain gutters of the vehicles for suspending said nozzles therefrom in registry with the windows.

4. A motor vehicle air conditioning system for a drive-in theater comprising, in combination, a central air conditioning plant, warm and cold air delivery and return conduits connected to said plant, a plurality of tubular posts, horizontally elongated housings mounted on the upper ends of said posts, transverse partitions defining compartments in the housings, pairs of air conducting pipes extending vertically through the posts into the housings and connected at their lower ends to the conduits, T-heads on the upper ends of said pipes extending horizontally through the partitions, hose having one of their ends connected to the T-heads on opposite sides of the partitions, nozzles comprising discharge and intake compartments connected to the other ends of said hose, and means for securing said nozzles in position on vehicles on opposite sides of the posts in communication therewith through partially open windows thereof, said hose and said nozzles, when not in use, being storable in the compartments, said housings being open at their ends for providing access to the compartments for removing and replacing said hose and said nozzles, and lock-equipped doors hingedly mounted on the housings for closing said open ends thereof, said securing means including depending flanges on the nozzles adapted for face-abutting engagement with the upper portions of the window panes, and suspension hooks on the nozzles.

5. A motor vehicle air conditioning system for a drive-in theater comprising, in combination, a central air conditioning plant, warm and cold air delivery and return conduits connected to said plant, a plurality of tubular posts, horizontally elongated housings mounted on the upper ends of said posts, transverse partitions defining compartments in the housings, pairs of air conducting pipes extending vertically through the posts into the housings and connected at their lower ends to the conduits, T-heads on the upper ends of said pipes extending horizontally through the partitions, hose having one of their ends connected to the T-heads on opposite sides of the partitions, nozzles comprising discharge and intake compartments connected to the other ends of said hose, and means for securing said nozzle in position on vehicles on opposite sides of the posts in communication therewith through partially open windows thereof, said hose and said nozzles, when not in use, being storable in the compartments, said housings being open at their ends for providing access to the compartments for removing and replacing said hose and said nozzles, and lock-equipped doors hingedly mounted on the housings for closing said open ends thereof, said means including hooks on the upper portions of the nozzles engageable in rain gutters of the vehicles for suspending said nozzles therefrom in registry with the windows, said means further including depending flanges on the nozzles adapted for face-abutting engagement with the upper portions of the window panes.

References Cited in the file of this patent

UNITED STATES PATENTS

| | | |
|---|---|---|
| 2,588,756 | Ofterbro | Mar. 11, 1952 |
| 2,709,953 | Engle | June 7, 1955 |
| 2,746,372 | Smith | May 22, 1956 |
| 2,925,768 | Weibert | Feb. 23, 1960 |